US008898259B2

(12) United States Patent
Chen et al.

(10) Patent No.: US 8,898,259 B2
(45) Date of Patent: Nov. 25, 2014

(54) BOOKMARKING SYSTEM

(71) Applicant: Verizon Patent and Licensing Inc., Basking Ridge, NJ (US)

(72) Inventors: Ming Chen, Bedford, MA (US); Yong Liu, Brooklyn, NY (US); Dahai Ren, Lincoln, MA (US); Guibin Tian, Brooklyn, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 143 days.

(21) Appl. No.: 13/737,595

(22) Filed: Jan. 9, 2013

(65) Prior Publication Data

US 2014/0195647 A1 Jul. 10, 2014

(51) Int. Cl.
  *G06F 15/16* (2006.01)
  *H04L 29/08* (2006.01)
(52) U.S. Cl.
  CPC .................................... *H04L 67/10* (2013.01)
  USPC ........... 709/219; 709/217; 709/218; 709/238; 709/240
(58) Field of Classification Search
  CPC ....... H04L 67/10; H04L 67/30; H04L 67/125; H04L 67/306; H04L 12/588
  USPC .......................... 709/217, 218, 219, 238, 240
  See application file for complete search history.

(56) References Cited

U.S. PATENT DOCUMENTS

| | | | |
|---|---|---|---|
| 2012/0203734 A1* | 8/2012 | Spivack et al. | 707/602 |
| 2013/0031208 A1* | 1/2013 | Linton et al. | 709/217 |
| 2013/0124627 A1* | 5/2013 | Cathcart et al. | 709/204 |
| 2014/0143057 A1* | 5/2014 | Lessin et al. | 705/14.58 |
| 2014/0143058 A1* | 5/2014 | Lessin et al. | 705/14.58 |
| 2014/0143804 A1* | 5/2014 | Cheng et al. | 725/34 |

OTHER PUBLICATIONS

"Collaborative Filtering", http://en.wikipedia.org/wiki/Collaborative-filtering, printed Jan. 8, 2013, pp. 1-9.
Xiwang Yang, et al., "On Top-k Recommendation Using Social Networks", http://eeweb.poly.edu/faculty/yongliu/docs/Top-N-Recomm-tech-report.pdf, printed Jan. 8, 2013, pp. 1-10.
Xiwang Yang, et al., "Bayesian-interference Based Recommendation in Online Social Networks", http://eeweb.poly.edu/faculty/fongliu/docs/SN-recomm-tdke.pdf, printed Jan. 8, 2013, pp. 13.
"Social Network", http://wikipedia.org/wiki/Social_Network, printed Jan. 8, 2013, pp. 1-13.
Xiaoyuan Su, et al., "A Survey of collaborative filtering techniques", http://www.hindawi.com/journals/aai/2009/4214251, printed Jan. 8, 2013, pp. 1-19.
Changxi Zheng, et al., "Distributed Prefetching Scheme for Random Seek Support in Peer-to-Peer Streaming Applications", In Proc. Of ACM Workshop on Advances in Peer-to-Peer Multimedia Streaming, Singaport, Nov. 11, 2005, pp. 1-10.

* cited by examiner

*Primary Examiner* — Liangche A Wang

(57) ABSTRACT

A server is configured to receive a request for content from a user of a user device. The server is configured further to obtain a group of bookmarks for the content, the group of bookmarks being obtained based on at least one of viewing behavior of the user or viewing behavior of another user. The server is configured further to provide the content and the group of bookmarks to the user.

20 Claims, 11 Drawing Sheets

BOOKMARKING SYSTEM

BACKGROUND

A client device (e.g., a set top box) may receive content (e.g., video content, music content, etc.), via a network, from a content provider. A user of the client device may listen to or view the content. Additionally, the user may fast-forward or rewind (e.g., using a remote) through the content to get to a portion of the content that is of interest to the user.

DETAILED DESCRIPTION OF PREFERRED EMBODIMENTS

The following detailed description refers to the accompanying drawings. The same reference numbers in different drawings may identify the same or similar elements.

Systems and/or methods described as herein may generate personalized bookmarks for video content. The personalized bookmarks may be generated by using information associated with the user's own past viewing behavior with this video content and/or other video content. Additionally, the personalized bookmark may be generated by using information associated with another user's past viewing behavior (with this video content and/or other video content) that may be similar to the user's own viewing behavior. Additionally, the personalized bookmark may be generated by using information associated with another user's past viewing behavior who may have a social relationship (e.g., based on being friends through a social networking application) with the user.

Figure 1:
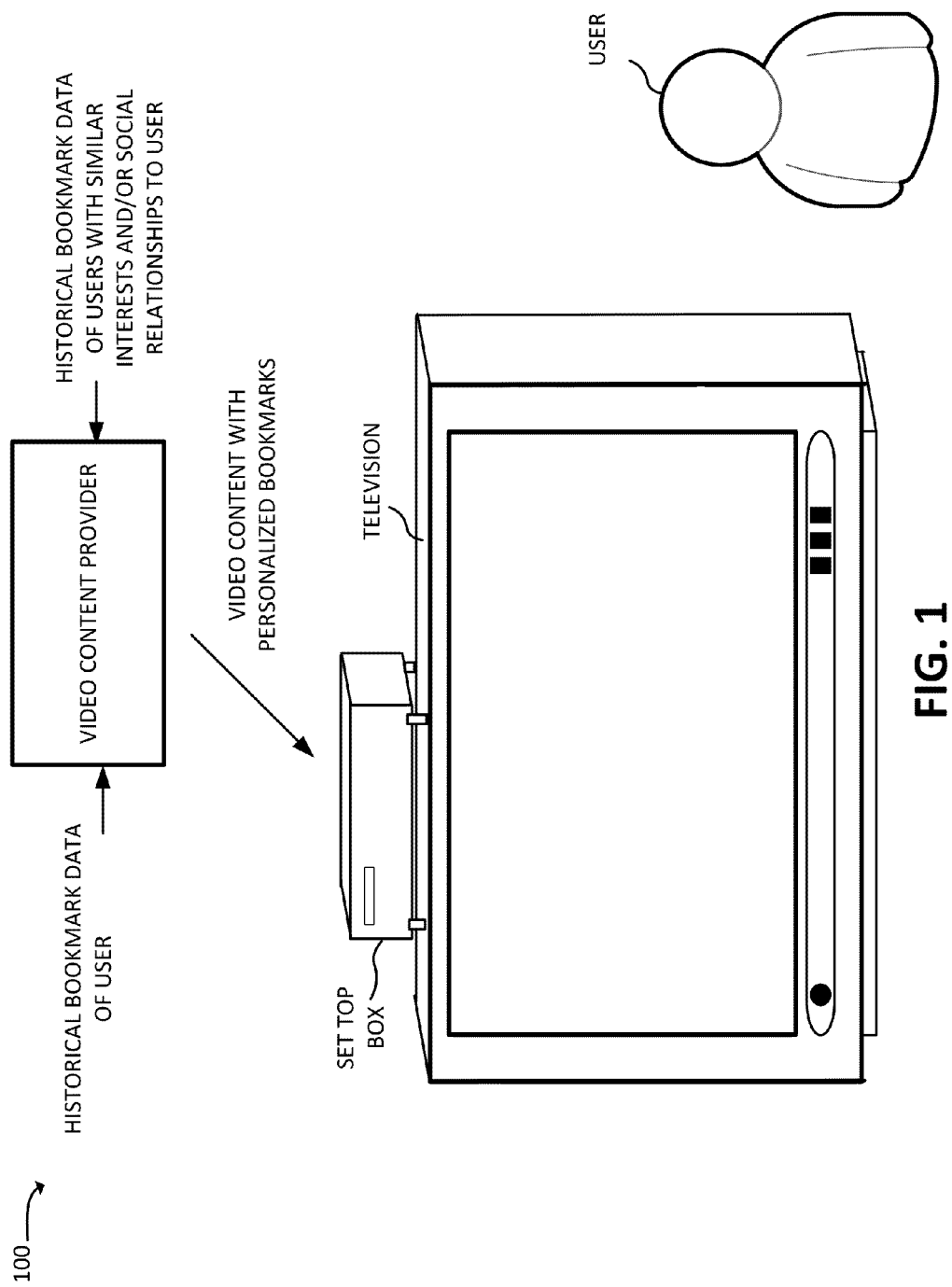
FIG. 1 is diagram of an overview of an implementation described herein.

FIG. 1 is a diagram of an overview 100 of an implementation described herein. Assume a set top box sends a request for video content to a video content provider, such as a request for on-demand movies, television programming, etc. The video content provider may receive the request and provide the video content, which includes personalized bookmarks, to the set top box.

The video content provider may generate the personalized bookmarks for the content based on a number of factors. For example, the video content provider may generate the personalized bookmarks based on historical data associated with the user. For example, assume that the video content is an action movie and that the user has watched a number of other action movies and has fast-forwarded to action scenes in the other action movies. Thus, the video content provider may create bookmarks for the requested video content at the beginning of each of the action scenes in the action movie based on the user's viewing behavior.

Additionally, or alternatively, the video content provider may generate the personalized bookmarks based on other users who have similar viewing behaviors as the user and/or other users who have similar viewing behaviors and have a social relationship with the user. For example, another user may also like action movies and the other user may have fast-forwarded to action scenes in the action movie requested by the user. Thus, the video content provider may create bookmarks for the requested video content at the beginning of each of the action scenes in the action movie based on the other user's viewing behavior.

The video content server may send the personalized bookmarks along with the video content to the set top box, as shown in FIG. 1. Assume that the video content is an action movie. If the user fast-forwards through the action movie, the user may be fast-forwarded to a particular point in the action movie based on the personalized bookmarks.

As a result, personalized bookmarks may enhance the user's viewing experience by predicting the particular points in time within the video content that may be of interest to the user. This may save the user time and effort in finding the parts of the video content that the user is interested in viewing.

Figure 2:
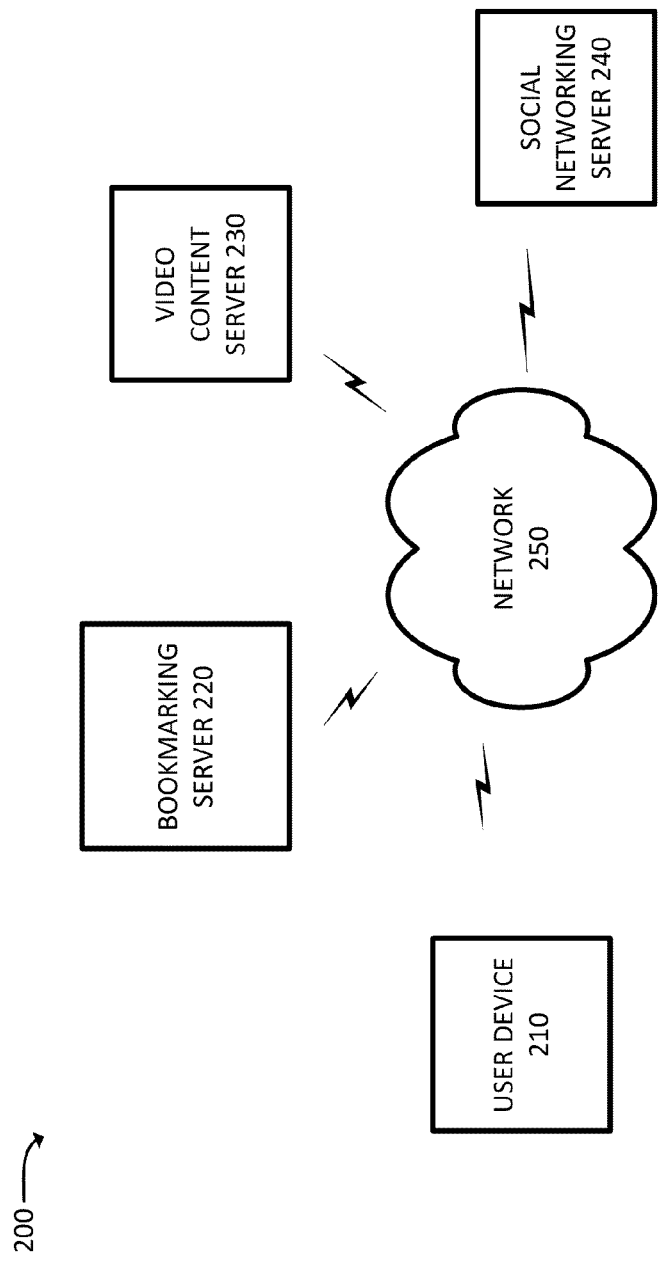
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a bookmarking server 220, a video content server 230, a social networking server 240, and a network 250.

User device 210 may include a device that is capable of receiving different types of content from a network service provider associated with a network (e.g., network 250). For example, user device 210 may include a set-top box, a personal computer, a laptop computer, a tablet computer, a smart phone, a gaming system, a television, a cable card, a digital video recorder (DVR), a TV tuner card, or another device that is capable of outputting audio and/or video media including music, video content, and/or other types of information.

Bookmarking server 220 may include one or more server devices that generate a personalized bookmark for video content requested by a user. Bookmarking server 220 may receive information associated with the past viewing behavior of the user, of user device 210, and the past viewing behavior of other users, of other user devices 210, and use this information to generate the personalized bookmark.

Video content server 230 may include one or more server devices that provide video content to user device 210. In some implementations, video content server 230 and bookmarking server 220 may be the same device.

Social networking server 240 may include one or more server devices that provide a social networking application. For example, social networking server 250 may provide and/or interface with a social networking application, such as Facebook, Twitter, MySpace, and/or another social networking application.

Network 250 may include one or more wired and/or wireless networks. For example, network 250 may include a cellular network, a public land mobile network (PLMN), a second generation (2G) network, a third generation (3G) network, a fourth generation (4G) network, a fifth generation (5G) network, and/or another network. Additionally, or alternatively, network 250 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or combination of these or other types of networks.

The quantity of devices and/or networks, illustrated in FIG. 2 is provided for explanatory purposes only. In practice, there may be additional devices and/or networks; fewer devices and/or networks; different devices and/or networks; and differently arranged devices and/or networks than illustrated in FIG. 2. Also, in some implementations, one or more of the devices of environment 200 may perform one or more functions described as being performed by one or more other devices of environment 200. Devices of environment 200 may interconnect via wired connections, wireless connections, or a combination of wired and wireless connections.

Figure 3:
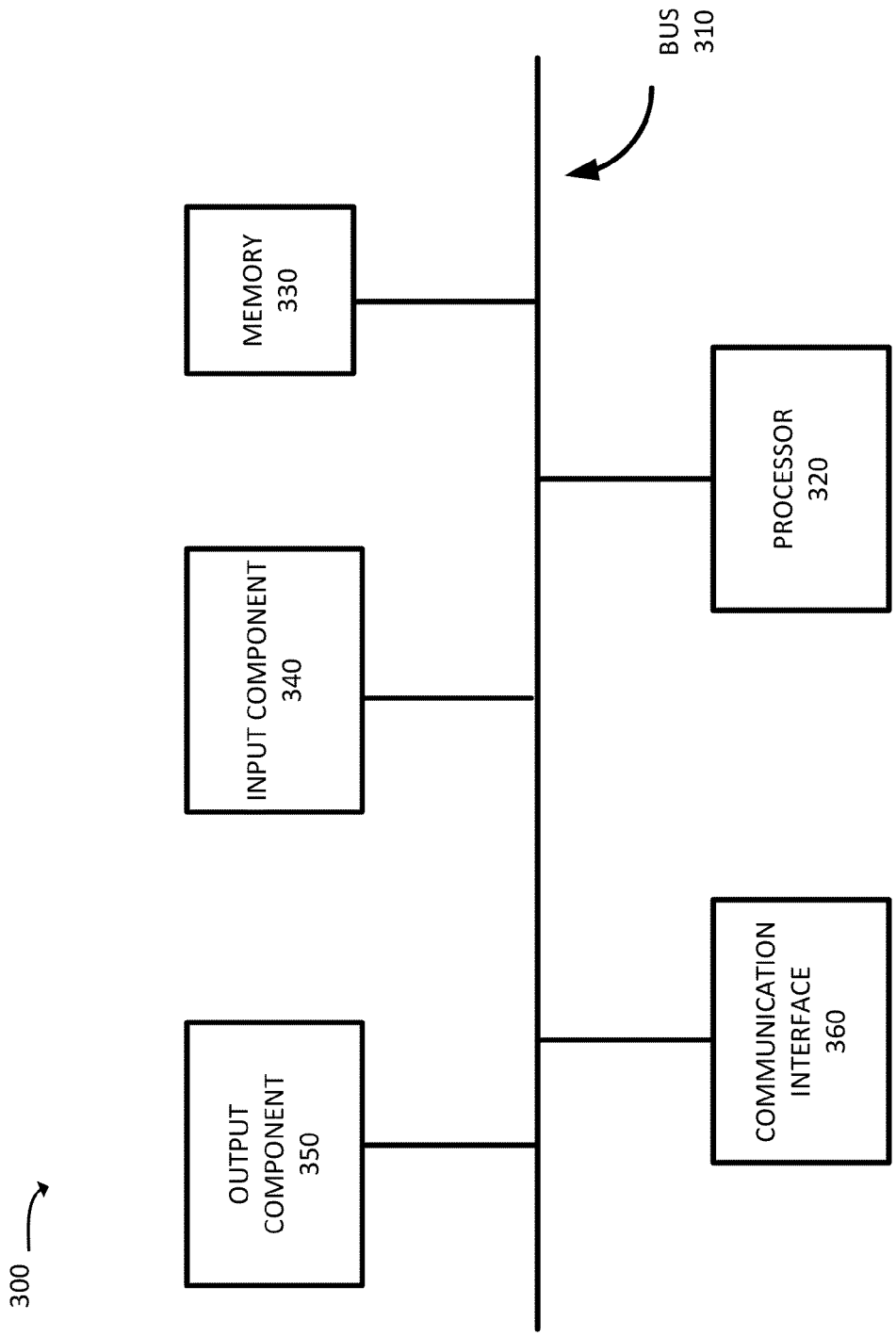
FIG. 3 is a diagram of example components of one or more devices of FIG. 2.

FIG. 3 is a diagram of example components of a device 300. Device 300 may correspond to user device 210, bookmarking server 220, video content server 230, and/or social networking server 240. Additionally, or alternatively, each of user device 210, bookmarking server 220, video content server 230, and social networking server 240 may include one or more devices 300 and/or one or more components of device 300.

As shown in FIG. 3, device 300 may include a bus 310, a processor 320, a memory 330, an input component 340, an output component 350, and a communication interface 360.

Bus 310 may include a path that permits communication among the components of device 300. Processor 320 may include one or more processors, microprocessors, or processing logic (e.g., a field programmable gate array (FPGA), or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320.

Input component 340 may include a component that permits a user to input information to device 300, such as a keyboard, a keypad, a button, a microphone, a switch, etc. Output component 350 may include a component that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In some implementations, communication interface 360 may include, for example, a transmitter that may convert baseband signals from processor 320 to radio frequency (RF) signals and/or a receiver that may convert RF signals to baseband signals. In some implementations, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communication interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communication interface 360 and transmit the RF signals over the air, and receive RF signals over the air and provide the RF signals to communication interface 360. In one implementation, for example, communication interface 360 may communicate with network 250 and/or devices connected to network 250.

As will be described in detail below, device 300 may perform certain operations. Device 300 may perform these operations in response to processor 320 executing software instructions (e.g., computer program(s)) contained in a computer-readable medium, such as memory 330. A computer-readable medium may be defined as a non-transitory memory device. A memory device may include memory space within a single physical storage device or memory space spread across multiple physical storage devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

The quantity of components, illustrated in FIG. 3 is provided for explanatory purposes only. In practice, there may be additional components; fewer components; different components; and differently arranged components than illustrated in FIG. 3.

Figure 4A:
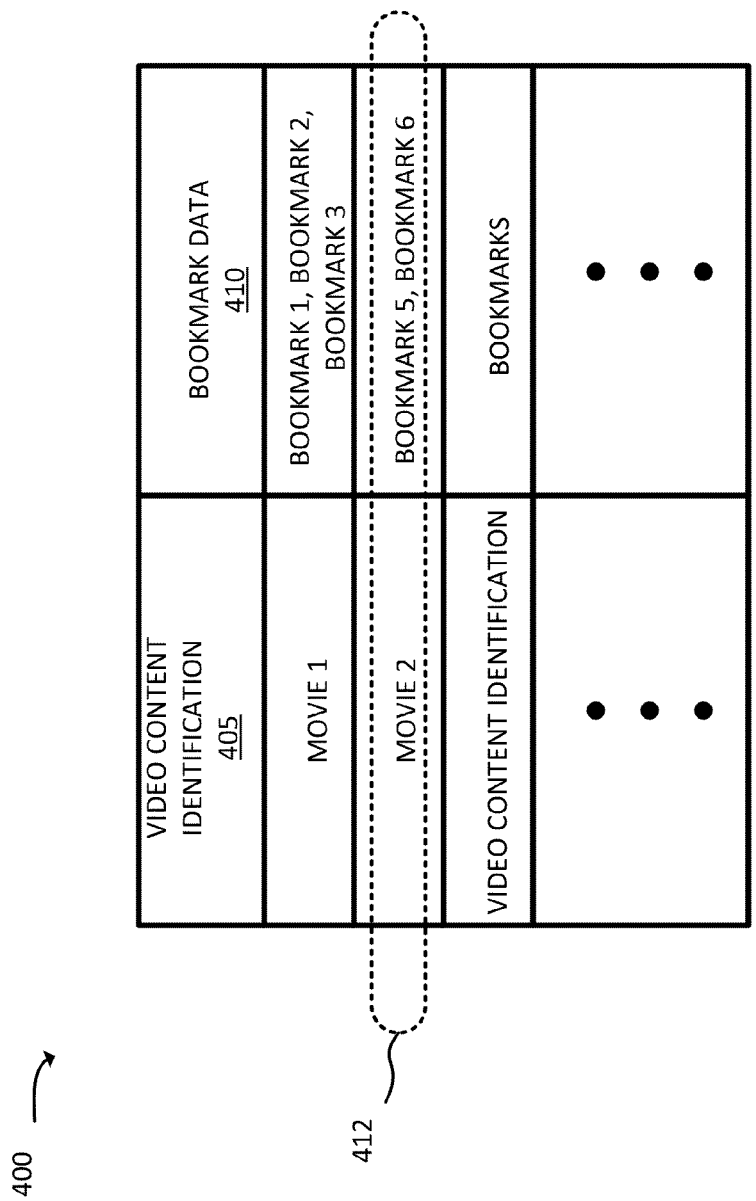
FIGS. 4A-4B are diagrams of example data structures.

FIG. 4A is an example data structure 400 that stores relationships between bookmark data and video content for a particular user. There may be more than one data structure 400, with each data structure 400 associated with a different user. In some implementations, user device 210 may store some or all of data structure 400. In some implementations, bookmarking server 220 may store some or all of data structure 400. In some implementations, video content server 230 may store some or all of data structure 400. In some implementations, data structure 400 may be stored in memory, associated with another device or a group of devices, separate from, or in combination, with memory associated with user device 210, bookmarking server 220, and/or video content server 230.

Data structure 400 may include a collection of fields, such as video content identification field 405 and bookmark data field 410.

Video content identification field 405 may store information that uniquely identifies particular video content. The information may include a name of the particular video content, an identification code associated with the particular video content, or any other unique identifier for the particular video content. As shown within ellipse 412, in the example of FIG. 4A, video content identification field may store information that identifies a particular video content as "movie 2."

Bookmark data field 410 may store one or more identifiers for different personalized bookmarks associated with the particular video content identified in video content identification field 405. As shown within ellipse 412, in the example of FIG. 4A, "movie 2" may be associated with "bookmark 5" and "bookmark 6." Each personalized bookmark described in bookmark data field 410 may be associated with a particular point in time within the video content identified in video content identification field 405. For example bookmark 5 may be associated with 17 minutes and 32 seconds into movie 2 and bookmark 6, for example, may be associated with 48 minutes and 1 second into movie 2.

While FIG. 4A shows example fields 405-410, in some implementations, data structure 400 may include fewer fields, different fields, additional fields, and/or differently arranged fields than depicted in FIG. 4A.

Figure 4B:
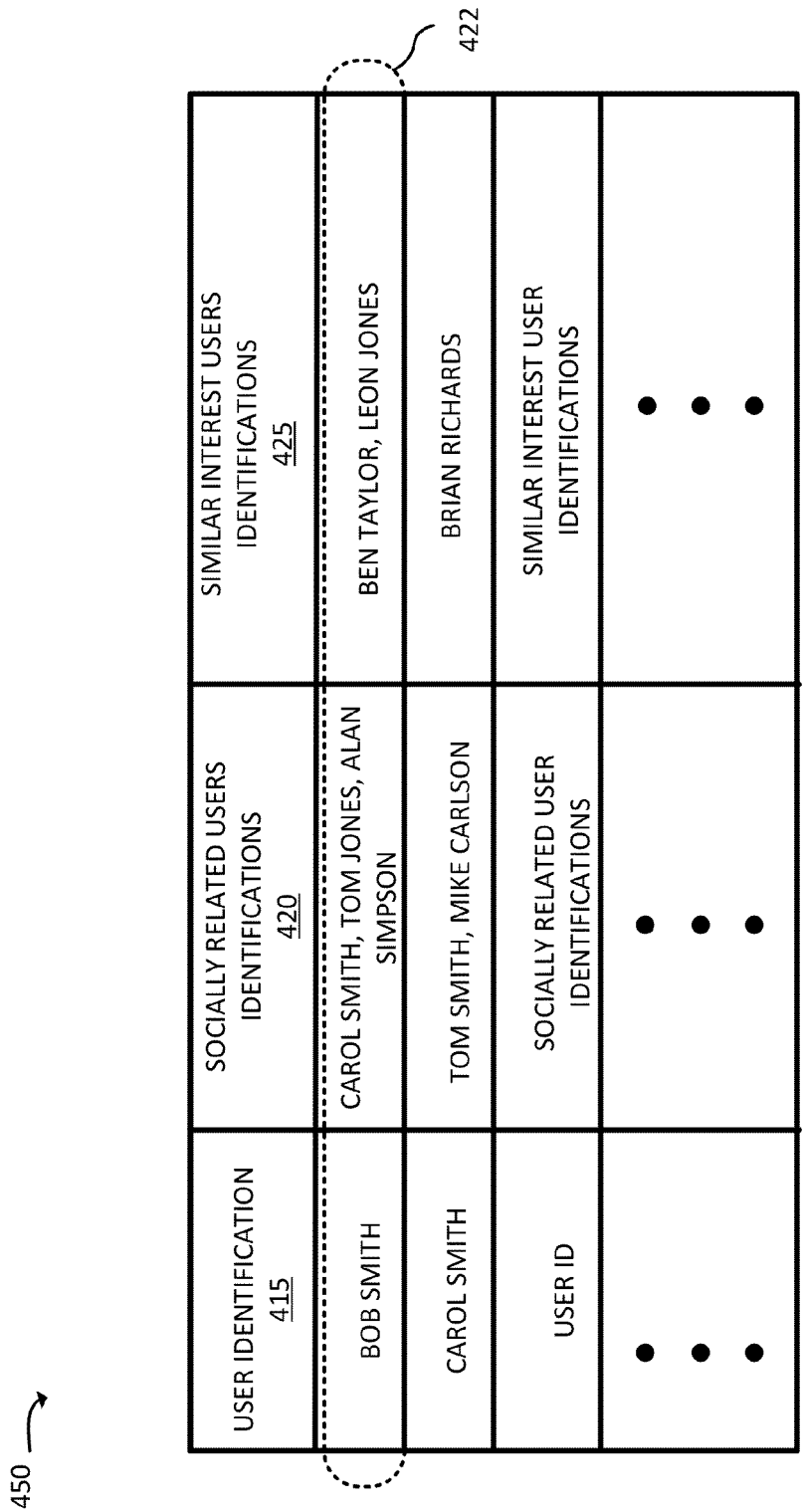

FIG. 4B is an example data structure 450 that stores relationships between different users. In some implementations, user device 210 may store some or all of data structure 450. In some implementations, bookmarking server 220 may store some or all of data structure 450. In some other example implementations, video content server 230 may store some or all of data structure 450. In some implementations, data structure 450 may be stored in memory, associated with another device or a group of devices, separate from, or in combination, with memory associated with user device 210, bookmarking server 220, and/or video content server 230.

Data structure 450 may include a collection of fields, such as user identification field 415, social related users identifications field 420, and similar interest users identifications field 425.

User identification field 415 may store an alias, name, or any other unique identifier for a user of user device 210. As shown within ellipse 422, in the example of FIG. 4B, an alias for a particular user may be "Bob Smith."

Social related users identifications field 420 may store an alias, name, or any other unique identifier for other users of other user devices 210. These other users may have a social relationship with the user identified in user identification field 415. These other users may have similar interests with the user based on viewing similar types of video content and similar viewing behavior (e.g., fast-forwarding to similar points in time within video content). For example, these other users may be friends with the user via a social networking application provided by social networking server 240. As shown within ellipse 422, in the example of FIG. 4B, an alias for users who have a social relationship with the user may be "Carol Smith," "Tom Jones," and "Alan Simpson."

Similar interest users identifications field 425 may store an alias, name, or any other unique identifier for other users of user devices 210. These other users may have one or more similar interests to those of the user based on the other user's viewing similar types of video content and having similar viewing behavior (e.g., fast-forwarding to similar points in time within the video content). As shown within ellipse 422, in the example of FIG. 4B, an alias for users, who have similar interests to the user, may be "Ben Taylor," and "Leon Jones."

While FIG. 4B shows example fields 415-425, in some implementations, data structure 450 may include fewer fields, different fields, additional fields, and/or differently arranged fields than depicted in FIG. 4B.

Figure 5:
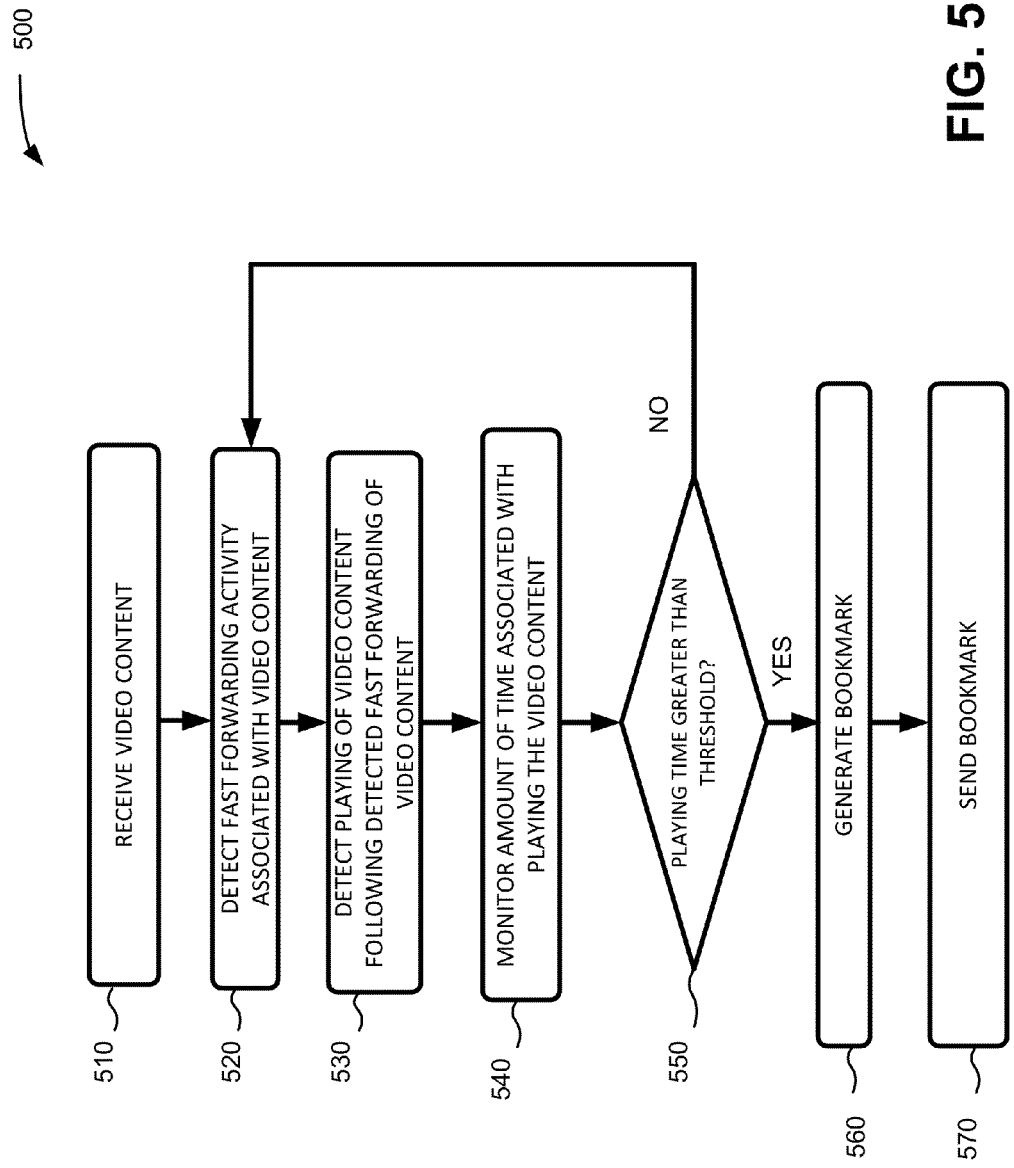
FIG. 5 is a flow chart of an example process for monitoring user behavior.

FIG. 5 is a flow chart of an example process 500 for generating bookmarks for video content. In some implementations, process 500 may be performed by user device 210. In some implementations, one or more blocks of process 500 may be performed by one or more other devices, such as bookmarking server 220 and/or video content server 230. While the following description includes monitoring a user's viewing behavior, the user would be provided the opportunity to opt out of the monitoring. In some implementations, the monitoring of the user's viewing behavior may require the user to opt-in, as opposed to opting out.

Process 500 may include receiving video content (block 510). For example, user device 210 may receive video content from video content server 220, via network 250. Video content server 220 may send the video content to user device 210 based on the user of user device 210 selecting the video content (e.g., the user selecting the video content by using a menu that provides options of different movies, television programs, pre-recorded sporting events, etc.).

Process 500 may include detecting fast-forwarding activity associated with the video content (block 520). For example, a user may cause user device 210 to fast-forward through the video content by, for example, entering a command, such as the user selecting a "fast-forward" mode on a remote control, a touch screen, etc. User device 210 may detect that the video content is being fast-forwarded based on receiving the command.

Process 500 may include detecting the playing of video content following the detection of the fast-forwarding of the video content (block 530). For example, a user may cause user device 210 to play the video content by, for example, entering a command, such as the user selecting a "play" mode on a remote control, a touch screen, etc.

Process 500 may include monitoring the amount of time associated with playing the video content (block 540). For example, user device 210 may monitor the amount of time that the video content was in the "play" mode after the video content is in the "fast-forward" mode.

Process 500 may include determining whether the amount of time that the video content is played is greater than a threshold (block 550). For example, user device 210 may determine whether the amount of time is greater than the threshold. The threshold may correspond to that amount of time where it can be assumed that the user fast-forwarded to the desired location in the video content.

In some implementations, the threshold may be based on the length of the video content and/or the type of video content (e.g., a one hour length movie may have a threshold value of 14 seconds, a two hour length documentary may have a threshold value of 45 seconds, etc.).

In some implementations, the threshold may be specified by the user of user device 210. For example, the user may specify the threshold by using a user interface displayed by user device 210. For example, the user may provide, to the user interface, the amount of time that is to be associated with the threshold.

In some implementations, the user may specify, by using the user interface, that user device 210 may only monitor the user's interaction (e.g., the fast-forwarding and playing) with particular types of video content and at particular times of the day. For example, the user may specify, using the user interface, that user device 210 is not to monitor video content selected at after 5:00 p.m. on a Saturday.

In some implementations, the user may specify that user device 210 is not to monitor any of the user's interactions with any type of video content.

If the playing time is not greater than the threshold (block 550—NO), then process 500 may include detecting the fast-forwarding activity associated with the video content (block 520). For example, user device 210 may detect other fast forwarding activity, detect other instances of playing the video content after the fast-forwarding activity, and monitor the amount of time associated with playing the video content, as described with regards to blocks 520-540.

If, on the other hand, the playing time is greater than the threshold (block 550—YES), then process 500 may include generating a bookmark (block 560). For example, user device 210 may generate a bookmark that is associated with a point in time associated with the video content being in the "play" mode that occurs immediately after the period of time that the video content was in the "fast-forward" mode.

Process 500 may include sending the bookmark (block 570). For example, user device 210 may send information relating to the bookmark (via network 250) to bookmarking server 220. The information may include information that identifies the user, of user device 210, the information identifying video content, and the information identifying the bookmark. Bookmarking server 220 may store the received information in a data structure, such as data structure 400, described with regard to FIG. 4A.

While process 500 in FIG. 5 has been described with regards to generating a bookmark, process 500 may also be described with regards to generating a bookmark associated with when the video content is in the "play" mode (for an amount of time that exceeds the threshold) after the video content has been in a "rewind" mode (e.g., the user using a remote control for rewinding the video content).

While a series of blocks has been described with regard to FIG. 5, the blocks and/or the order of the blocks may be modified in some implementations. Further, non-dependent blocks may be performed in parallel.

Figure 6:
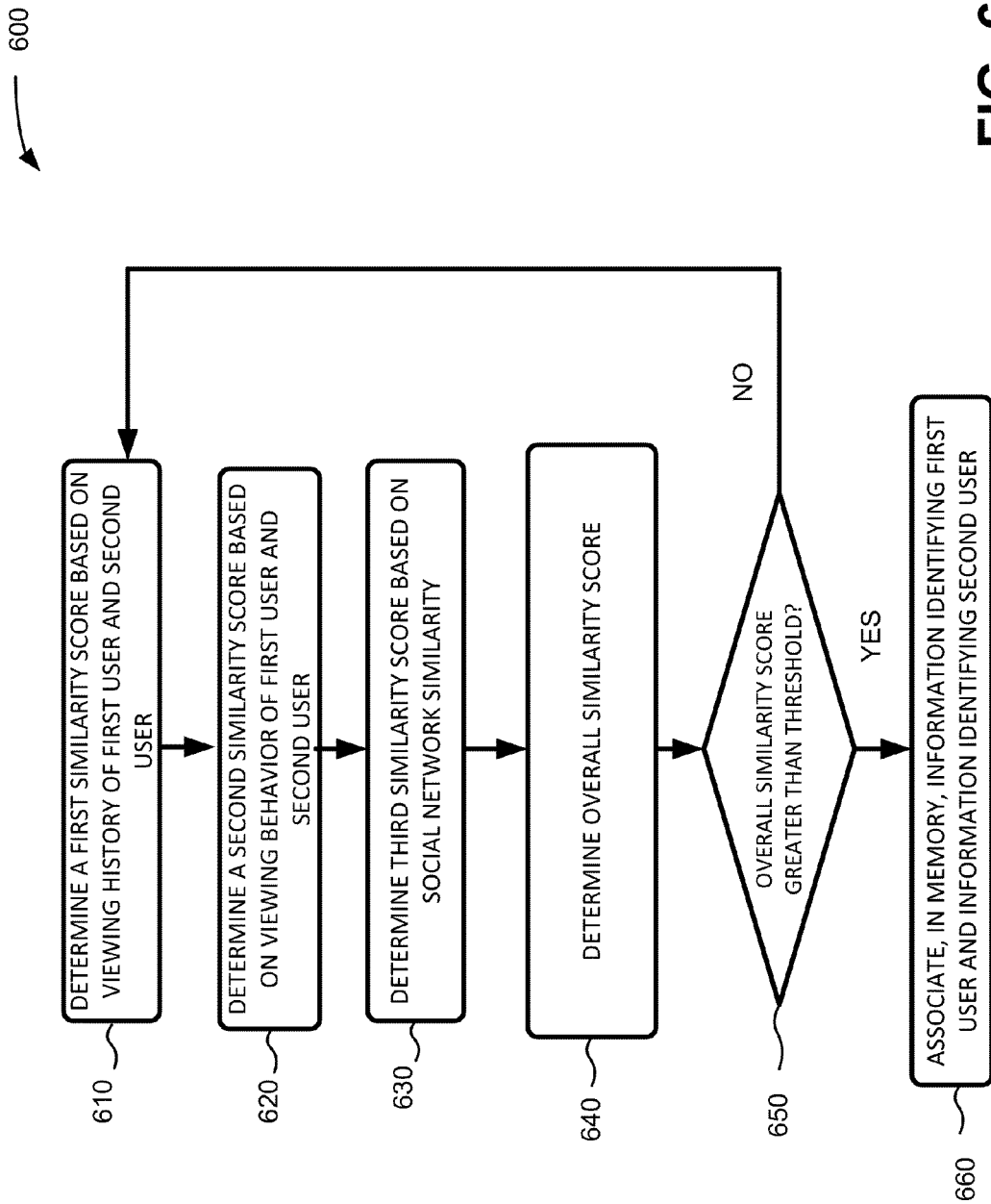
FIG. 6 is a flow chart of an example process for finding similar viewing behaviors between different users.

FIG. 6 is a flow chart of an example process 600 for finding similar viewing behaviors between different users. In some implementations, process 600 may be performed by bookmarking server 220. In some implementations, one or more blocks of process 600 may be performed by one or more other devices, such as user device 210 and/or video content server 230.

Process 600 may include determining a first similarity score, for a first user and a second user, based on viewing history of the first user and the second user (block 610). For example, bookmarking server 220 may receive the viewing history for a first user from a first user device 210 and the viewing history of a second user from a second user device 210. The viewing history may include an identifier of the video content viewed by the first user and the second user. The viewing history may be associated with a particular period of time (e.g., two days, one week, one month, etc.) over which the viewing history of the first user and the second user are analyzed. Bookmarking server 220 may determine a similarity score for the first user by comparing the viewing behaviors of different users to the viewing behavior of the first user over different period of times. For example, bookmarking server 220 may compare the viewing behavior of the first user to the viewing behavior of the second user for one week, and then bookmarking server 220 may compare the viewing behavior of the first user to the viewing behavior of a different user during the following week.

Bookmarking server 20 may determine that, based on the viewing behavior of the first user and the viewing behavior of the second user, there is video content that has been viewed by both the first user and the second user. Further, bookmarking server 220 may determine the amount of time the first user played the video content and the amount of time the second user played the video content. Based on these factors, bookmarking server 220 may use the following example formula to determine the first similarity score $S_1$:

$$S_1(U_1, U_2) = sizeof(C_1) \frac{\sum_{i \in C_1}(\Delta_{1,i} - \overline{\Delta_1})(\Delta_{2,i} - \overline{\Delta_2})}{\sqrt{\sum_{i \in C_1}(\Delta_{1,i} - \overline{\Delta_1})^2 \sum_{i \in C_1}(\Delta_{2,i} - \overline{\Delta_2})^2}}$$

In the example formula, "$S_1(U_1,U_2)$" may refer to the first similarity score based on the first user ("$U_1$") and the second user ("$U_2$"). In the example formula, "$C_1$" may refer to the video content that has been sent to the first user device 210 (associated with the first user) and to the second user device 210 (associated with the second user). In the example formula, "$\Delta_{1,i}$" may refer to the total playing time that the first user device 210 plays a particular video content (e.g., the amount of time that the user viewed the particular video content.) In the example formula, "$\Delta_{2,i}$" may refer to the total playing time that the second user device 210 plays the same video content associated with "$\Delta_{1,i}$." In the example formula, "$\overline{\Delta_1}$" may refer to the average time that the first user device 210 plays video content. For example, if the first user device 210 has played three different movies with a first movie playing for one hour, a second movie playing for two hours, and a third movie playing for three hours, then "$\overline{\Delta_1}$" is two hours. In the example formula, "$\overline{\Delta_2}$" may refer to the average time that the second user device 210 plays video content.

Alternatively, bookmarking server 220 may use the following formula to determine the first similarity score $S_1$:

$$S_1(U_1, U_2) = sizeof(C_1) \frac{\sum_{i \in C_1}\Delta_{1,i}\Delta_{2,i}}{\sqrt{\sum_{i \in C_1}\Delta_{1,i}^2 \sum_{i \in C_1}\Delta_{2,i}^2}}$$

Process 600 may include determining a second similarity score, for the first user and the second user, based on the viewing behavior of the first user and the second user (block 620). For example, bookmarking server 220 may receive the viewing behavior of the first user from a first user device 210 and bookmarking server 220 may receive the viewing behavior of the second user from the second user device 210. The viewing behavior may be associated with bookmarks that were generated for the first user and the second user, for example, in a manner similar to that described above with regard to FIG. 5.

Bookmarking server 220 may compare bookmarks associated with the first user with bookmarks associated with the second user to determine the second similarity score. Bookmarking server 220 may determine, for example, a time difference between a bookmark associated with the first user and a bookmark associated with the second user. For example, a first user may have a bookmark associated at 45 minutes into a particular video content and the second user may have a bookmark associated with 55 minutes into the particular video content. Thus, in the above example, the time difference is 10 minutes. If the time difference is less than a threshold time, then bookmarking server 220 may determine that the two bookmarks are similar. Bookmarking server 220 may use the following formula to determine the second similarity score $S_2$:

$$S_2(U_1, U_2) = sizeof(C_2) \frac{\sum_{i \in C_2}(f_{1,i} - \overline{f_1})(f_{2,i} - \overline{f_2})}{\sqrt{\sum_{i \in C_2}(f_{1,i} - \overline{f_1})^2 \sum_{i \in C_2}(f_{2,i} - \overline{f_2})^2}}$$

In the example formula, "$S_2(U_1,U_2)$" may refer to the second similarity score based on the first user ($U_1$) associated with a first user device 210 and a second user ($U_2$) associated with a second user device 210. "$C_2$" may refer to the video content sent to the first user and the second user that have similar bookmarks. In the example formula, "$f_{1,i}$" may refer to an amount of playing time that occurs after fast-forwarding activity by the first user for a particular video content. In the example formula, "$f_{2,i}$" may refer to an amount of playing time that occurs after fast-forwarding activity by the second user for the particular video content. In the example formula, "$T_1$" may refer to the average time that the first user plays video content after the first user fast-forwards the video content. In the example formula, "$T_2$" may refer to the average time that the second user plays video content after the second user fast-forwards the video content. Alternatively, bookmarking server 220 may use the following formula to determine the second similarity score $S_2$:

$$S_2(U_1, U_2) = sizeof(C_2) \frac{\sum_{i \in C_2} f_{1,i} f_{2,i}}{\sqrt{\sum_{i \in C_2} f_{1,i}^2 \sum_{i \in C_2} f_{2,i}^2}}$$

Process 600 may include determining a third similarity score, for the first user and the second user, based on social networking similarity (block 630). For example, bookmarking server 220 may determine the similarity between the first user and the second user based on a social relationship between the two users.

Bookmarking server 220 may receive the social relationship information from social networking server 240. Bookmarking server 220 may have permission from the first user to access the first user's social networking account associated with social networking server 240. Bookmarking server 220 may have (based on the first user's permission) the first user's login information that permits the bookmarking server 220 to access the first user's social networking account. Bookmarking server 220 may also have permission from other users (such as the second user) to access their social networking accounts associated with social networking server 240. By using multiple social networking accounts associated with different users, bookmarking server 220 may generate relationships between the different users and assign a numerical value to how one user is related to another user.

Bookmarking server 220 may analyze the relationship between different users by using, for example, a social nodal network. Bookmarking server 220 may use the social nodal network to determine the strength of the relationship between different users. For example, two users who are direct friends may have a greater similarity than two users who are indirectly friends via another user.

Bookmarking server 220 may determine whether any of the first user's friends associated with a particular social networking application are receiving video content services with the same network service provider (associated with bookmarking server 220). Bookmarking server 220 may also analyze messages between the first user and other users regarding shared interests (e.g., sports, types of movies, etc.).

Bookmarking server 220 may use the following formula to determine the third similarity score $S_3$:

$$S_3(U_1, U_2) = \frac{1}{\text{Shortest\_weighted\_dist}(U_1, U_1)}$$

In the example formula, "$S_3(U_1, U_2)$" may refer to the third similarity score based on the first user and the second user. In the example formula, "Shortest_weighted_dist$(U_1, U_2)$" may refer to the numerical value assigned to how the first user is related to the second user. For example, the first user may be, via a social networking application, friends with the second user. Since there is a direct relationship, bookmarking server 220 may, for example, assign a first value since the two users are directly related as friends. However, if, for example, the first user is friends with another user and the other user is friends with the second user, then bookmarking server 220 may, for example, assign a second different value of two since the first user and the second user are not directly related as friends. The larger the weighted distance value, the less of a social relationship exists between the two users.

Process 600 may include determining an overall similarity score for the first user and the second user (block 640). For example, bookmarking server 220 may determine an overall similarity score between the first user and the second user based on using the first similarity score, the second similarity score, and/or the third similarity score. In some implementations, bookmarking server 220 may obtain the overall similarity score by multiplying the first similarity score, $S_1$, the second similarity score $S_2$, and the third similarity score $S_3$.

In some implementations, bookmarking server 220 may combine the first similarity score, $S_1$, the second similarity score $S_2$ and the third similarity score $S_3$ in other ways to obtain the overall similarity score. For example, bookmarking server 220 may use one or more different types of algorithms (e.g., Bayesian networks, clustering models, latent semantic models, singular value decomposition, probabilistic latent semantic analysis, etc.) to generate the overall similarity score and/or any of the individual similarity scores.

Process 600 may include determining whether the overall similarity score is greater than a threshold (block 650). For example, the overall similarity score may be compared to a threshold value stored by bookmarking server 220. The threshold value may equal the minimum overall similarity score that indicates that the two users are similar enough for bookmarking server 220 to add a personalized bookmark to video content sent to a user.

If the overall similarity score is not greater than the threshold (block 650—NO), then process 600 may include selecting a different second user and repeating blocks 610-640, described above, in connection with the different second user.

If the overall similarity score is greater than the threshold (block 650—YES), then process 600 may include associating, in memory, information identifying the first user and information identifying the second user (block 660). For example, bookmarking server 220 may associate the first user with the second user in a data structure, such as within data structure 450 (described with regard to FIG. 4B). The relationship may be used by bookmarking server 220 to generate personalized bookmarks for the first user and the second user.

While a series of blocks has been described with regard to FIG. 6, the blocks and/or the order of the blocks may be modified in other implementations. Further, non-dependent blocks may be performed in parallel.

Figure 7:
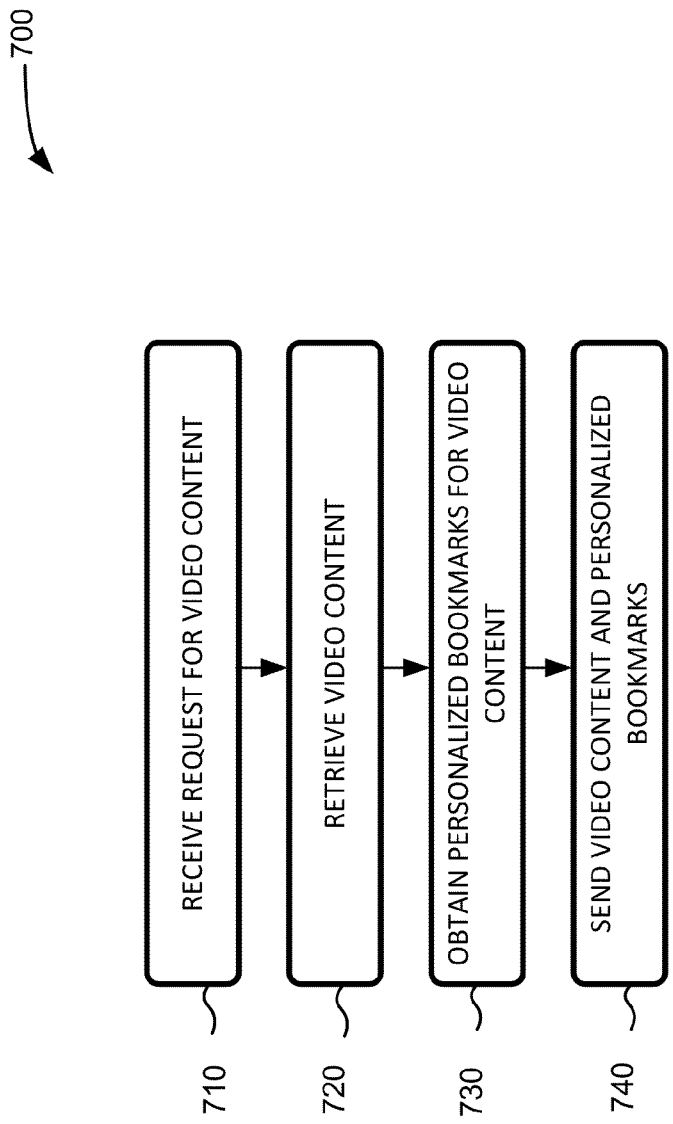
FIG. 7 is a flow chart of an example process for using a personalized bookmark.

FIG. 7 is a flow chart of an example process 700 for using a personalized bookmark. In some implementations, process 700 may be performed by video content server 230. In some implementations, one or more blocks of process 700 may be performed by one or more other devices, such as bookmarking server 220 and/or user device 210.

Process 700 may include receiving a request for video content (block 710). For example, video content server 230 may receive a request (via network 250) for video content from user device 210. User device 210 may send the request based on the user of user device 210 selecting the video content (e.g., the user selecting the video content in a user interface).

Process 700 may include retrieving the video content (block 720). For example, video content server 230 may retrieve the video content from a library of video content stored by video content server 230 or another server device associated with video content server 230.

Process 700 may include obtaining personalized bookmarks for the video content (block 730). For example, video content server 230 may send a request, to bookmarking server 220, to obtain personalized bookmarks for the video content. The request may include information identifying the video content and information identifying the user. Bookmarking server 220 may determine, based on the video content and the user of user device 210, whether to add personalized bookmarks to the video content.

Bookmarking server 220 may determine the number of other users that have a viewing behavior that is similar to the viewing behavior of the user. Bookmarking server 230 may also determine the number of users that have bookmarks that are similar to the bookmarks associated with the user. By taking a ratio of these two values, bookmarking server 220 may use the following example formula to determine whether to add a personalized bookmark to the video content:

$$P = \frac{\sum_{i=1}^{m} S_i}{\sum_{j=1}^{n} S_j}$$

In the above example formula, "P" may refer to the probability to add the bookmark to a particular point in time within the video content. In the above example formula, the numerator "$S_i$" denotes the summation of all the users ("m") that have the bookmark. In the above example formula, the denominator "$S_j$" refers to the summation of all the users ("n") that receive video content via network 250.

If "P" is greater than a threshold value ("$P_T$") stored by bookmarking server 220, then bookmarking server 220 may add the bookmark as a personalized bookmark to the requested video content.

In some example implementations, bookmarking server 220 may add an advertisement (e.g., audio, text, video, etc.) to the personalized bookmark. Bookmarking server 220 may use information regarding the type of video content being played and/or information from social networking server 240 to determine the content of the advertisement. When video content is fast-forwarded to the point in time associated with the personalized bookmark, the user may be presented with an advertisement. The user may have the option to opt-out of receiving advertisements.

Process 700 may include sending the video content and the personalized bookmarks (block 740). For example, video content server 230 may send (via network 250) the video content and the personalized bookmarks to user device 210. The user of user device 210 may view the video content. When the user, of the user device 210, selects the fast-forward option (e.g., by using a remote control with a fast-forward button, touching a fast-forward selection on a display screen that has touch-screen capabilities, etc.), user device 210 may detect the fast-forward selection. User device 210 may, based on detecting the fast-forward selection, fast-forward to the point in time associated with the personalized bookmark that is closest in time from where the user began to fast-forward the video content.

If video content server 230 is streaming video content to user device 210 and the video content associated with the personalized bookmark has not yet been sent to user device 210, then user device 210 may send a request to video content server 230 to send the video content that is at the point in time in the video content associated with the personalized bookmark. Video content server 230 may send the video content associated with the personalized bookmark to user device 210.

In some implementations, the user may send a command, to user device 210, to cause user device 210 to jump to the closest bookmark. For example, in some implementations, the user may push a fast-forward button (e.g., on a remote control) to cause user device 210 to jump to the bookmarked location in the video content. In some implementations, the user may configure user device 210 to jump to a bookmarked location in response to detecting a particular quantity of pushes of the fast-forward button. For example, the user may configure user device 210 to fast-forward through the video content in response to a single push of the fast-forward button to jump to a bookmarked location, or multiple pushes of the fast-forward button. In some implementations, the user may configure user device 210 to jump to a bookmarked location in response to pushing another button or combination of buttons on, for example, the remote control.

While process 700 in FIG. 7 has described with regards to fast-forwarding video content to a particular point in time (associated with the personalized bookmark) in the video content, process 700 may also be described with regards to rewinding video content to a particular point in time (associated with the personalized bookmark) in the video content.

While a series of blocks has been described with regard to FIG. 7, the blocks and/or the order of the blocks may be modified in other implementations. Further, non-dependent blocks may be performed in parallel.

Figure 8A:
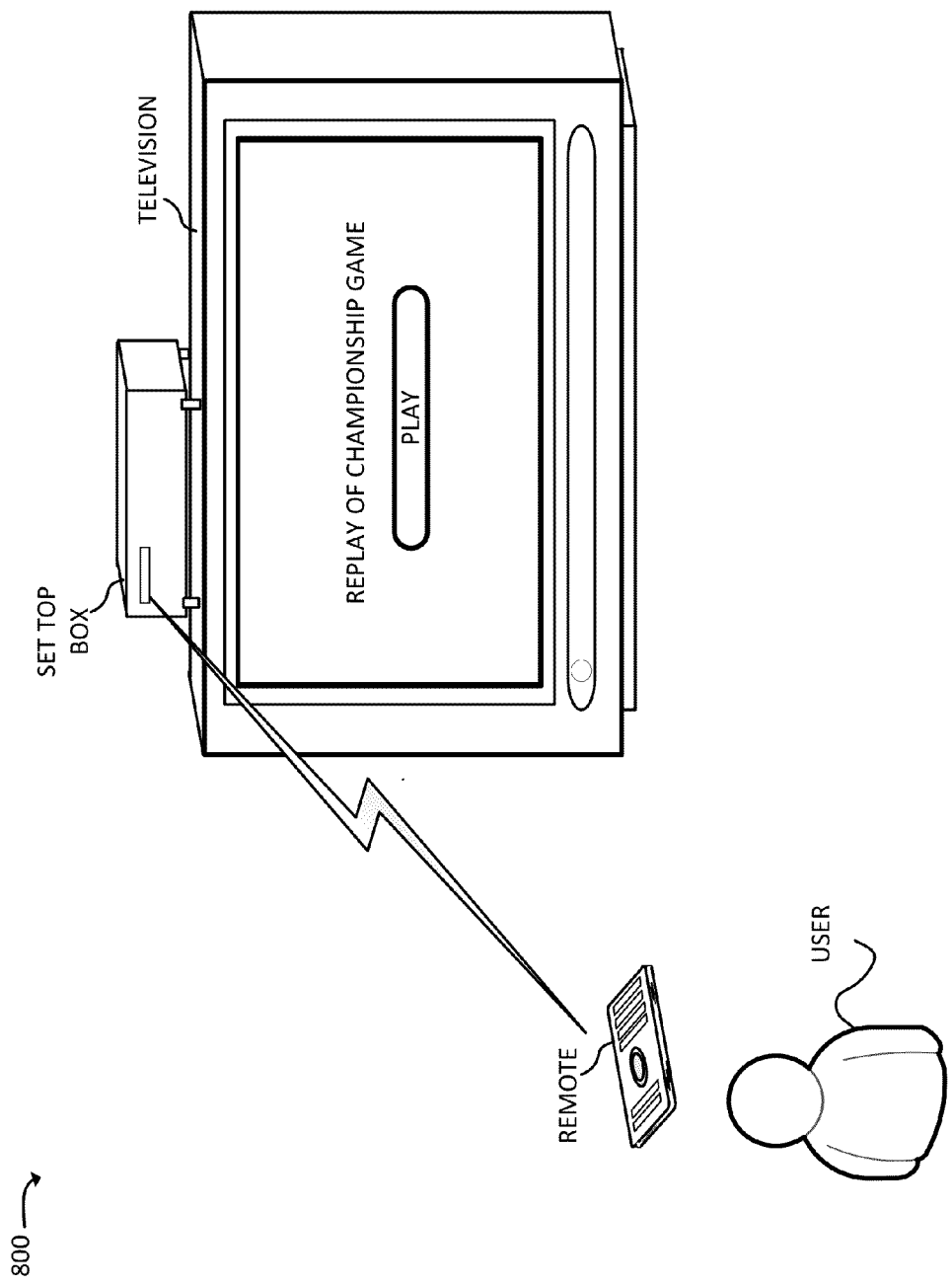
FIGS. 8A-8C are diagrams of example processes for using a personalized bookmark in video content.
Figure 8B:
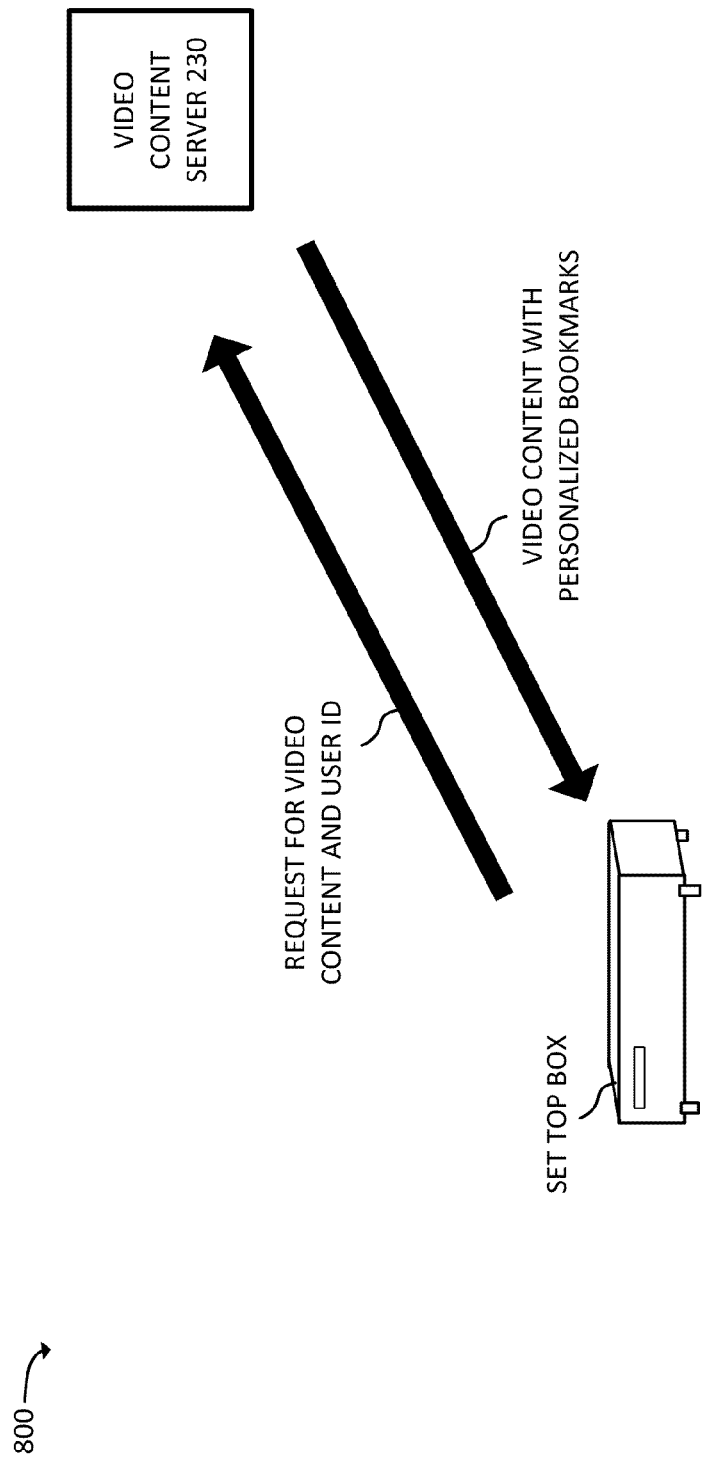
Figure 8C:
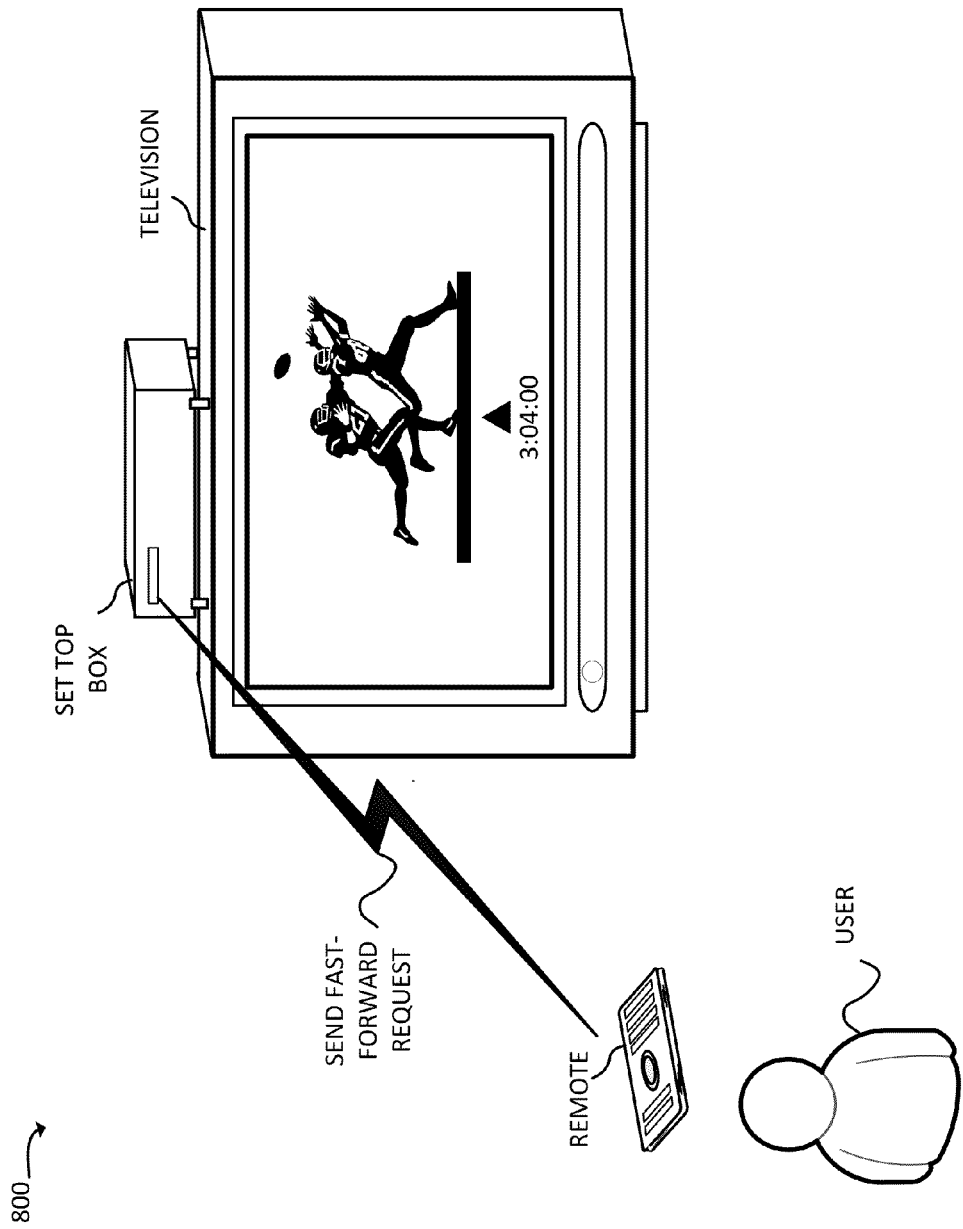

FIGS. 8A-8C are an example 800 of process 700 described above with regard to FIG. 7. For example 800, assume a user wants to watch the replay of a video associated with a championship football game. The user may use a remote control to send a communication to a set top box and select the play option for the video displayed on a television, as shown in FIG. 8A.

As shown in FIG. 8B, the set top box may send a request for the video content to video content server 230. Video content server 230 may receive the request for the video content. Video content server 230 may retrieve the video content from a library of video content stored by video content server 230. Video content server 230 may add personalized bookmarks, to the video content, based on the user's past viewing behavior and/or another user's past viewing behavior. One of the personalized bookmarks may be associated with the last drive of the championship football game, based on the user's past viewing behavior of video content associated with football games. Video content server 230 may send the video content with personalized bookmarks to the set top box.

The set top box may receive the video content and the personalized bookmarks associated with the championship game. The set top box may send the video content to the television and the user may view the championship game on the television. At a later time, assume that the user decides to select the fast-forward mode by using the remote control. As shown in FIG. 8C, the remote control may send a signal to the set top box. The set top box may determine, based on the fast-forwarding selection by the user, to jump to the personalized bookmark that is associated with a point in time within the video content that is closest in time from the point in the video from where the user began fast-forwarding the video content. As shown in FIG. 8C, the user views the last drive of the game which occurs at three hours, four minutes, and zero seconds.

Systems and/or methods described as herein may generate personalized bookmarks for video content. As a result, the personalized bookmarks may enhance the user's viewing experience by predicting the particular points in time within the video content that are of interest to the user. This may save the user time and effort in finding the parts of the video content that the user is interested in viewing.

The foregoing description of implementations provides illustration and description, but is not intended to be exhaustive or to limit the implementations to the precise form disclosed. Modifications and variations are possible in light of the above disclosure or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a server, a request for content from a user of a user device;
   generating, by the server, a first score by comparing a first viewing behavior of the user and a second viewing behavior of another user;
   generating, by the server, a second score by comparing a first bookmark, associated with the user, to a second bookmark associated with the other user;
   generating, by the server, an overall score based on the first score and the second score;
   generating, by the server and based on the overall score, a group of bookmarks for the content,
      the group of bookmarks being personalized for the user; and
   providing, by the server, the content and the group of bookmarks to the user device,
      the group of bookmarks allowing the user to jump to particular locations within the content.

2. The method of claim 1, where generating the overall score includes:
   generating a third score based on a social relationship between the user and the other user; and
   combining the first score, the second score, and the third score to generate the overall score.

3. The method of claim 2, where generating the third score includes:
   receiving information regarding the user and the other user from a social networking server,
      the social networking server being associated with a social networking application used by the user and the other user; and
   generating the third score based on receiving the information.

4. The method of claim 1, where generating the first score includes:
   receiving information indicating that previous content requested by the user is same as previous content requested by the other user; and
   generating the first score based on receiving the information.

5. The method of claim 1, where the first viewing behavior of the user is associated with fast-forwarding the content.

6. The method of claim 1, where the first viewing behavior of the user is associated with rewinding the content.

7. The method of claim 1, where generating the second score comprises:
   analyze a difference in time between a first point in time associated with the first bookmark and a second point in time associated with the second bookmark;
   determine that the first bookmark and the second bookmark are similar based on the difference in time; and
   generate the second score based on determining that the first bookmark and the second bookmark are similar.

8. A system comprising:
   a server to:
      receive a request for content from a user of a user device;
      generate a first score based on a first viewing behavior of the user and a second viewing behavior of another user;
      generate a second score based on a first bookmark, associated with the user, and a second bookmark associated with the other user;
      generate an overall score based on the first score and the second score;
      obtain, based on the overall score, a group of personalized bookmarks for the content; and
      provide the content and the group of personalized bookmarks to the user device,
         the group of personalized bookmarks allowing the user to jump to particular points in time within the content.

9. The system of claim 8, where the first viewing behavior of the user is associated with fast-forwarding or rewinding of the content.

10. The system of claim 7, where, when generating the overall score, the server is to:
    generate a third score associated with determining a social relationship between the user and the other user; and
    use the first score, the second score, and the third score to generate the overall score.

11. The system of claim 8, where, when generating the second score, the server is to:
    analyze the first bookmark associated with the user and the second bookmark associated with the other user;
    determine that the first bookmark and the second bookmark are similar based on analyzing the first bookmark and the second bookmark; and
    generate the second score based on determining that the first bookmark and the second bookmark are similar.

12. The system of claim 11,
    where, when analyzing the first bookmark and the second bookmark, the server is to:

analyze a difference in time between a first point in time associated with the first bookmark and a second point in time associated with the second bookmark, and where, when determining that the first bookmark and the second bookmark are similar, the server is to:

determine that the difference in time is less than a threshold; and determine that the first bookmark and the second bookmark are similar based on the difference in time being less than the threshold.

13. The system of claim 8, where, when providing the content and the group of personalized bookmarks to the user device, the server is to:

provide an advertisement that is played when the user plays the content at a bookmark of the group of personalized bookmarks.

14. The system of claim 8, where, when obtaining the group of personalized bookmarks, the server is to:

analyze a social relationship between the user and the other user based on analyzing information received from a social networking server; and obtain the group of personalized bookmarks based on the overall score and the social relationship.

15. A non-transitory computer-readable medium storing instructions, the instructions comprising:

a plurality of instructions that, when executed by one or more processors of a server, cause the one or more processors to:

receive a request for content from a user of a user device;

generate a first score based on a first viewing behavior of the user and a second viewing behavior of another user;

generate a second score based on a first bookmark, associated with the user, and a second bookmark associated with the other user;

generate an overall score based on the first score and the second score;

obtain, based on the overall score, a group of bookmarks for the content, the group of bookmarks being personalized for the user; and provide the content and the group of bookmarks to the user device, the group of bookmarks allowing the user to jump to particular locations within the content.

16. The non-transitory computer-readable medium of claim 15, where one or more instructions, of the plurality of instructions, to obtain the group of bookmarks include one or more instructions to:

receive information regarding the user and the other user from a social networking server, the social networking server being associated with a social networking application used by the user and the other user; and generate a third score based on receiving the information, and where one or more instructions, of the plurality of instructions, to generate the overall score include one or more instructions to:

generate the overall score based on the third score.

17. The non-transitory computer-readable medium of claim 15, where one or more instructions, of the plurality of instructions, to generate the second score include one or more instructions to:

analyze the first bookmark associated with the user and the second bookmark associated with the other user;

determine that the first bookmark and the second bookmark are similar based on analyzing the first bookmark and the second bookmark; and generate the second score based on determining that the first bookmark and the second bookmark are similar.

18. The non-transitory computer-readable medium of claim 17, where one or more instructions, of the plurality of instructions, to determine that the first bookmark and the second bookmark are similar include one or more instructions to:

analyze a difference in time between a first point in time associated with the first bookmark and a second point in time associated with a second bookmark;

determine that the difference is less than a threshold; and determine that the first bookmark and the second bookmark are similar based on the difference in time being less than the threshold.

19. The non-transitory computer-readable medium of claim 15, where the instructions further comprise:

one or more instructions that, when executed by the one or more processors, cause the one or more processors to:

generate advertisements associated with the group of bookmarks.

20. The non-transitory computer-readable medium of claim 15, where the first viewing behavior of the user is associated with fast-forwarding or rewinding the content.

* * * * *